April 22, 1958 L. DREYFUS Re. 24,462

POLYPHASE STIRRING WINDING

Original Filed Aug. 10, 1954

Inventor
Ludwig Dreyfus
By James Aiken
Attorney.

United States Patent Office

Re. 24,462
Reissued Apr. 22, 1958

24,462

POLYPHASE STIRRING WINDING

Ludwig Dreyfus, Vasteras, Sweden, assignor to Allmanna Svenska Elektriska Aktiebolaget, Vasteras, Sweden, a Swedish corporation Original No. 2,759,035, dated August 14, 1956, Serial No. 448,841, August 10, 1954. Application for reissue April 25, 1957, Serial No. 658,904

Claims priority, application Great Britain August 11, 1953

17 Claims. (Cl. 13—26)

Matter enclosed in heavy brackets [ ] appears in the original patent but forms no part of this reissue specification; matter printed in italics indicates the additions made by reissue.

The present invention relates to an improvement in stirring windings for melting furnaces or hot metal mixers.

In hitherto known stationary stirring windings for arc furnaces the winding is fed by symmetrical two-phase current with the result that the phase position of the A. C. currents changes from one current zone to the following zone with 90° displacement. Since there are five current zones, 1, 2, 3, 4, 5 (having respectively $n_1$, $n_2$, $n_3$, $n_4$ and $n_5$ conductors), the phase position for the two outermost zones 1 and 5 is the same. Due to the fact that the winding is mounted symmetrically with respect to the middle with the numbers of conductors in the five zones having the relationship, $$n_1=\frac{n_3}{2}=n_5$$

and $n_2=n_4$, the two phases 1, 3, 5 and 2, 4, respectively, do not induce each other. These known stirring windings have been constructed as conventional coil windings, i. e. like the stator windings of polyphase synchronous generators or asyn-chronous motors. Thus the winding is embedded in a coarsely laminated slotted iron core and is fixed therein by laying the conductors into the slots and by staying the long double-curved ends of the coils by means of strong screw joints.

The above described stirring windings have the disadvantages that their manufacture is expensive, that a large stock of spare parts is required, since the coils are of unequal dimensions, and the winding requires a lot of space.

The stirring winding according to the present invention, by means of which the above drawbacks are all overcome, is characterised in that the winding consists of hollow coils, which slide on to coarsely laminated yokes without slots for retaining the conductors, and in that the winding of each yoke consists of five successive sections 1, 2, 3, 4, 5 having numbers of turns $n_1=n_5$, $n_2=n_4$, $n_3 \gtrless 2n_1$ and is fed symmetrically from two phases so that the current in one phase has 90° phase displacement with respect to the current in the other phase.

Such a stirring winding consists of five coils which can be wound in a simple winding machine. The coarsely laminated yoke may consist of two straight legs, which are joined together and positioned below the bottom of the furnace.

Two embodiments of the invention will now be described by way of example with reference to the accompanying drawing, in which—

Figure 1A:
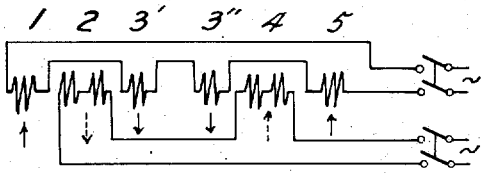
Figure 1:
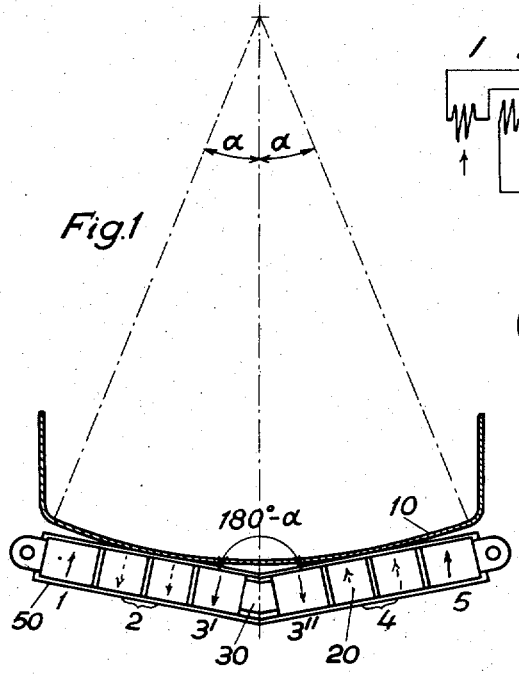
Figure 3:
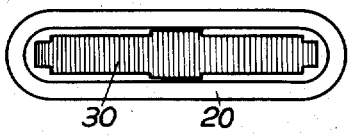
Figure 2A:
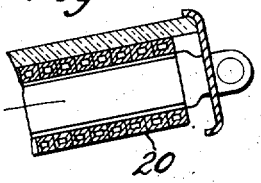
Figure 2:
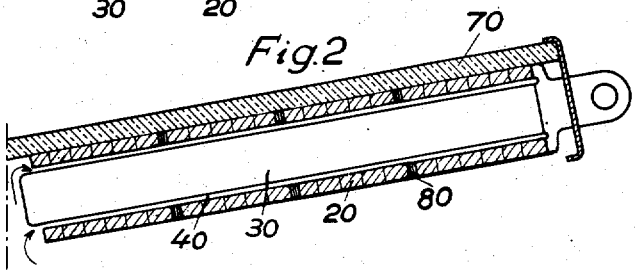
Figure 4:
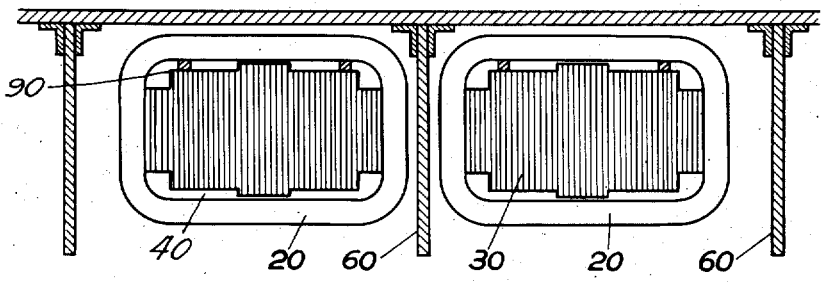

Figure 1 shows one form of the stirring winding arranged below the bottom of the furnace, Figure 1a is a wiring diagram for the coils of the stirring winding, Figures 2 and 2a show modified forms of a part of the winding Figure 1, Figure 3 is an end view of the winding and core parts shown at Figures 2 and 4, Figure 4 is a view corresponding to Figure 3 but showing a modified form of windings and cores arranged below a furnace bottom having staying girders.

Referring to Figures 1–3, the bottom of the furnace is designated by 10. The stirring winding, generally designated by 20, is a two-phase winding for a furnace having a curved bottom. The coarsely laminated iron yoke has its laminations indicated by vertical lines in Figures 3 and 4 and consists of two straight legs 30, which are joined together at an angle of $180°-\alpha$, where the centre angle of the furnace bottom is $2\alpha$. Each leg supports coils having three current zones 1, 2, 3' and 3'', 4, 5 respectively, wherein 3' and 3'' constitute one current zone. The condition for symmetry is that the number of turns of the current zones $n_1=n_5$, $n_2=n_4$, but for the total number of turns of the middle zone $n_3 \lesseqgtr (n_1+n_5)$ is permissible. The wiring diagram for the coils of the stirring winding is shown in Figure 1a. The coils 1, 3', 3'' and 5 are fed from one phase while the coils 2 and 4 are fed from the other phase, the directions of the currents being indicated by full line arrows and dotted line arrows, respectively, for the corresponding phases. The lightest yoke is obtained with $n_3<(n_1+n_5)$. The coils of this configuration are all of equal radial dimensions so that the keeping of a stock of spare parts is facilitated. The coils are insulated from each other by means of intermediate pieces 80. The stirring windings may be protected by means of members 70 of refractory material positioned between the winding and the bottom of the furnace. Ventilation and cooling ducts 40 are arranged between the yoke 30 and the coils 20. See Figures 2 and 4, the flow of air being indicated by the arrows in Figure 2. Spacer bars 90 are inserted between the coils and the yoke. The winding may also be constructed for internal water cooling as indicated in Figure 2a.

Measures may be taken for minimising the reactive power of the winding. In contradistinction to the coil winding of the conventional type, in the new winding approximately the same flux per cm. length of conductor emerges from its lower side and short sides. This flux does not contribute to the stirring forces but increases the reactive power to the same amount as or somewhat above the amount occurring in coil windings of the known type. It is therefore suitable to make the casing 50, by means of which the winding has to be protected, of metal of low electric ohmic resistivity. In this case, eddy currents are generated in the casing, which eddy currents minimise the ineffective part of the magnetic flux with the result that the reactive power is reduced.

In the case of a furnace with a plane bottom the yoke may consist of two straight legs, such as the legs 30 of Figure 1, which legs are joined together in alignment with each other and suitably reinforced. The middle current zone would be divided into two equal halves.

Finally the invention permits the division of the stirring means along their width into two or more narrower stirring means of equal length and equal zone distribution, which further facilitates the keeping of a stock of spare parts. This construction also permits the introduction of one or more girders (preferably of non-magnetic material) which act as staying means for supporting the bottom of the furnace. This embodiment is shown in Figure 4. The staying means are indicated by the numeral 60.

Although the new windings are described for use with melting furnaces, it lies in the scope of the invention to use them for hot metal mixers.

I claim as my invention:

1. Polyphase stirring winding system for stirring the metallic charge in a container for molten metal, comprising hollow coils, at least one laminated non-slotted magnetic yoke arranged below the bottom of the container and within said coils, the winding system of the coils consisting of five successive sections 1, 2, 3, 4, 5, having numbers of turns $n_1=n_5$, $n_2=n_4$, $n_3 \gtreqless 2n_1$, and being supplied with a polyphase current for symmetrically feeding the said successive sections so that the current in the one phase has 90° phase displacement with respect to the current in the other phase.

2. A polyphase stirring winding system according to claim 1, in which the middle section of the winding is divided into two equal halves symmetrically disposed about a central plane at right angles to the longitudinal extension of the winding.

3. A polyphase stirring winding system of the type described, comprising five successive sections arranged end-to-end and with the middle section divided into two equal halves disposed symmetrically about a central plane at right angles to the longitudinal extension of the winding, and a yoke consists of two equal legs joined together in alignment with each other to provide a reinforced junction.

4. A polyphase stirring winding system of the type described, comprising five successive sections placed below a curved bottom of a molten metal container having a center angle of $2\alpha$, and the middle section being divided into two equal halves disposed symmetrically about a central plane at right angles to the longitudinal extension of the winding, and a yoke consists of two equal legs forming an angle of approximately $180-\alpha$ at their junction point to provide a reinforced junction.

5. A polyphase stirring winding system according to claim 1, comprising intermediate pieces whereby the coils carrying current of different phases are insulated from each other and a space provided between the coils and the yoke for the purpose of cooling.

6. A polyphase stirring winding system according to claim 1, comprising metallic members of low ohmic resistivity covering at least a part of the lateral and lower sides of the coils for minimizing the ineffective part of the magnetic flux.

7. A polyphase stirring winding system according to claim 1, in which at least two such stirring windings in substantially parallel relationship with each other are arranged below the container, and comprising supporting means arranged between said windings for staying the bottom of the container.

*8. In combination with a container of molten metals and having a bottom, an induction stirrer for such metal having a winding system comprising a plurality of stationary electrical coils positioned adjacent the bottom of said container, said coils having an axis of the winding thereof generally parallel to said bottom, the winding system being symmetrical with respect to a plane through the bottom of said container at right angles to a line joining the central points of the two ends of the winding system, and a poly-phase power source for energising said coils and producing ampere-turns therein, the ampere-turns of one part of the system being 90° out of phase with respect to the ampere-turns of another part of the system.*

*9. A device as claimed in claim 8, said winding system including one part comprising two coil sections, said sections being connected to one phase of said power source and spaced apart from each other and having their ampere-turns 180° out of phase with each other, and another part connected to another phase and located between said spaced coil sections.*

*10. A device as claimed in claim 8, said winding system including a plurality of successive coil sections, two of said successive sections being connected to different phases, the ampere-turns of one of said coil sections being 90° out of phase with respect to the ampere-turns of the other coil section.*

*11. A device as claimed in claim 8, each part of said winding system being divided into two equal halves symmetrically disposed about said plane.*

*12. A device as claimed in claim 8, said winding system consisting of five successive coil sections, 1, 2, 3, 4, 5, having numbers of turns $n_1=n_5$, $n_2=n_4$, $n_3 \gtreqless 2n_1$, the sections 1, 2 and half of section 3 being arranged symmetrically in respect to the sections 4, 5 and the other half of section 3 about said plane, the sections 1, 3, 5, being connected to one phase, the sections 2, 4 being connected to another phase of said poly-phase power source.*

*13. A device as claimed in claim 8, said winding system comprising five successive coil sections arranged end-to-end and with the middle section divided into two equal halves disposed symmetrically about said plane and a yoke comprising two legs, said legs joined together in alignment with each other.*

*14. A device as claimed in claim 8, said winding system comprising five successive coil sections placed below a curved bottom of a molten metal container, said bottom having a centre angle of $2\alpha$, and the middle section being divided into two equal halves disposed symmetrically about said plane, and a yoke comprising two legs, said legs joined together and forming an angle of approximately $180-\alpha$.*

*15. A device as claimed in claim 8, the winding system comprising intermediate pieces whereby the coils carrying current of different phases are insulated from each other and a space provided between the coils and the yoke for the purpose of cooling.*

*16. A device as claimed in claim 8, the winding system comprising metallic members of low ohmic resistivity covering at least a part of the lateral and lower sides of the coils for minimizing the ineffective part of the magnetic flux.*

*17. A device as claimed in claim 8, said induction stirrer comprising at least two winding systems in substantially parallel relationship with each other below the container and comprising supporting means arranged between said systems for staying the bottom of the container.*

References Cited in the file of this patent or the original patent

UNITED STATES PATENTS

| | | |
|---|---|---|
| 1,013,359 | Appel | Jan. 2, 1912 |
| 1,076,887 | Howard | Oct. 28, 1913 |
| 1,791,934 | Northrup | Feb. 10, 1931 |
| 1,851,984 | Rennerfelt | Apr. 5, 1932 |
| 1,937,065 | Moore | Nov. 28, 1933 |
| 1,943,802 | Northrup | Jan. 16, 1934 |
| 2,513,082 | Dreyfus | June 27, 1950 |
| 2,620,366 | Ladell | Dec. 2, 1952 |
| 2,652,441 | Gynt et al. | Sept. 15, 1953 |
| 2,686,823 | Jones | Aug. 17, 1954 |
| 2,759,035 | Dreyfus | Aug. 14, 1956 |
| 2,767,236 | Williamson | Oct. 16, 1956 |

FOREIGN PATENTS

| | | |
|---|---|---|
| 499,437 | Great Britain | Jan. 24, 1939 |